US007151216B1

(12) United States Patent
Hutmacher

(10) Patent No.: US 7,151,216 B1
(45) Date of Patent: Dec. 19, 2006

(54) SOLID BODY ELECTRIC GUITAR HAVING THE CAPABILITY OF PRODUCING ACOUSTIC GUITAR SOUND

(76) Inventor: Eric Hutmacher, 20851 Lassen St., No.: 8, Chatsworth, CA (US) 91311

( * ) Notice: Subject to any disclaimer, the term of this patent is extended or adjusted under 35 U.S.C. 154(b) by 200 days.

(21) Appl. No.: 10/952,086

(22) Filed: Sep. 28, 2004

(51) Int. Cl.
*G01D 3/00* (2006.01)

(52) U.S. Cl. ............................ 84/723; 84/725; 84/726; 84/730; 84/731; 84/743

(58) Field of Classification Search .................. 84/723, 84/725, 726, 730, 731, 743
See application file for complete search history.

(56) References Cited

U.S. PATENT DOCUMENTS

| | | | | |
|---|---|---|---|---|
| 4,630,520 | A * | 12/1986 | Bonanno | 84/655 |
| 4,867,028 | A * | 9/1989 | Jones | 84/735 |
| 5,227,575 | A * | 7/1993 | Mishima | 84/670 |
| 5,571,980 | A * | 11/1996 | Busley | 84/263 |

* cited by examiner

*Primary Examiner*—Gary F. Paumen
(74) *Attorney, Agent, or Firm*—David S. Nagy

(57) ABSTRACT

The invention is an electric guitar. In detail, the guitar includes a solid body and neck portions. A pressure sensor is mounted at the junction of the body and neck, the pressure sensor having the sensor element in direct contact with the guitar. An electric circuit connects the pressure sensor to an electrical connector mounted on an external surface of the guitar.

6 Claims, 3 Drawing Sheets

SOLID BODY ELECTRIC GUITAR HAVING THE CAPABILITY OF PRODUCING ACOUSTIC GUITAR SOUND

BACKGROUND OF THE INVENTION

1. Field of the Invention

The invention relates to the field of musical instruments such as guitars and, in particular, to a system for making a solid body electric guitar sound like an acoustic guitar.

2. Description of Related Art

Guitars are either acoustic or electric. The acoustic guitar depends upon the amplification produced by the guitar's hollow body acting as a sound box. Electric guitars, which generally have solid bodies, depend upon electro-magnetic sensors mounted under the strings to pick up the vibration thereof, which vibrations are then amplified and played through speakers. Of course microphone pickups have been mounted on electric guitars. Also electro-magnetic pickups have been mounted on acoustic guitars. However, the typical solid electric guitar has a unique, but different, sound than an acoustic guitar. It would be advantageous to be able to make a solid body electric guitar have the option of sounding like an acoustic guitar.

Thus, it is a primary object of the invention to provide an electric guitar having a solid body and neck with the capability of sounding like an acoustic guitar.

It is another primary object of the invention to provide an electric guitar having a solid body and neck with the capability of sounding like an acoustic guitar that uses simple easy-to-install technology.

It is a further object of the invention to provide an electric guitar having a solid body and neck with the capability of sounding like an acoustic guitar that allows the guitar player to easily switch from producing an electric guitar sound to an acoustic guitar sound, or to produce both sounds simultaneously.

SUMMARY OF THE INVENTION

The invention is a solid body electric guitar having the capacity to sound like an acoustic guitar. In detail, the electric guitar has solid body and neck portions with a pressure sensor mounted at the point where the neck is joined to body. In a preferred embodiment, an internal compartment is located within the body or neck. A pressure sensor is mounted in the compartment with the pressure sensor having a sensor element in direct contact with a surface of the compartment. An electric circuit connects the pressure sensor to an electrical outlet jack mounted on an external surface of the guitar for connecting to a sound reproduction system. Preferably, the pressure sensor is a piezoelectric pressure sensor mounted within the internal compartment. Alternately, the pressure sensor can be located externally at the end of neck at the point it joins the body.

The body and neck include a passageway which carries the wire leads from the pressure sensor to the outlet jack. In one version, a three-way switch is mounted on the body. The switch having a first position coupling only the pressure sensor to the outlet jack, a second position only coupling the electromagnetic pickups to the outlet jack and a third position coupling both said pressure sensor and the electromagnetic pickups to the output jack.

Alternately, the three way-switches can be deleted and the electrical outlet jack can be replaced with a stereo jack in which case the wire leads from the electromagnetic pickups and pressure sensor can be connected directly to the stereo jack. Thus, an external switch such as a foot operated switch can plug into the stereo jack and be used instead of the three-way switch.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
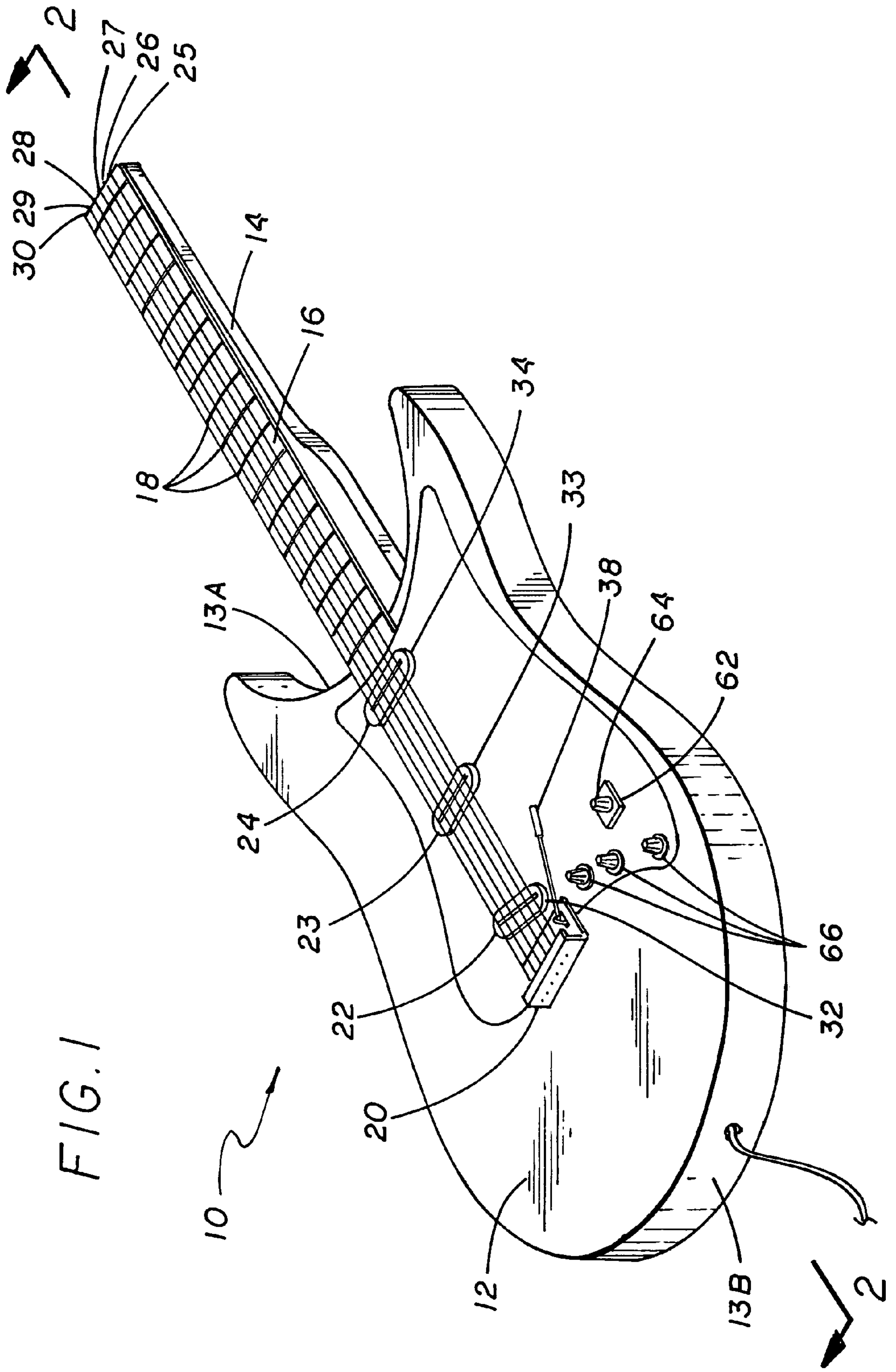
FIG. 1 is a partial perspective view of a solid body electric guitar.

As shown in FIG. 1, a solid body electric guitar 10 has a body 12, having ends 13A and 13B. A neck 14 is connected by its end 15 to the body 12 at end 13A. The neck 14 includes a fingerboard 16 carrying multiple frets 18. Body 12 additionally has a bridge 20 mounted thereon and groups of pickups 22, 23, 24. Bridge 20 is fixedly connected to proximal ends of guitar strings 25–30. Distal ends of strings 25–30 are connected to a head (not shown) of guitar 10. String 25 passes over fingerboard 16 and is connected to a pickup 32 of group 22, a pickup 33 of group 23 and a pickup 34 of group 24. In a similar manner, strings 26–30 are connected to pickups of groups 22, 23, 24. Pickups are well known to those skilled in the art. Additionally mounted on body 12 (FIG. 1) are potentiometers 66 that are used as volume and tone controls. In addition, the body 12 includes a tremolo arm 38. The above description is typical of a solid body type electric guitar. Typically, the neck 14 and body 12 are separated parts bonded together at the end 40 of the body. However other configurations are possible.

Figure 2:
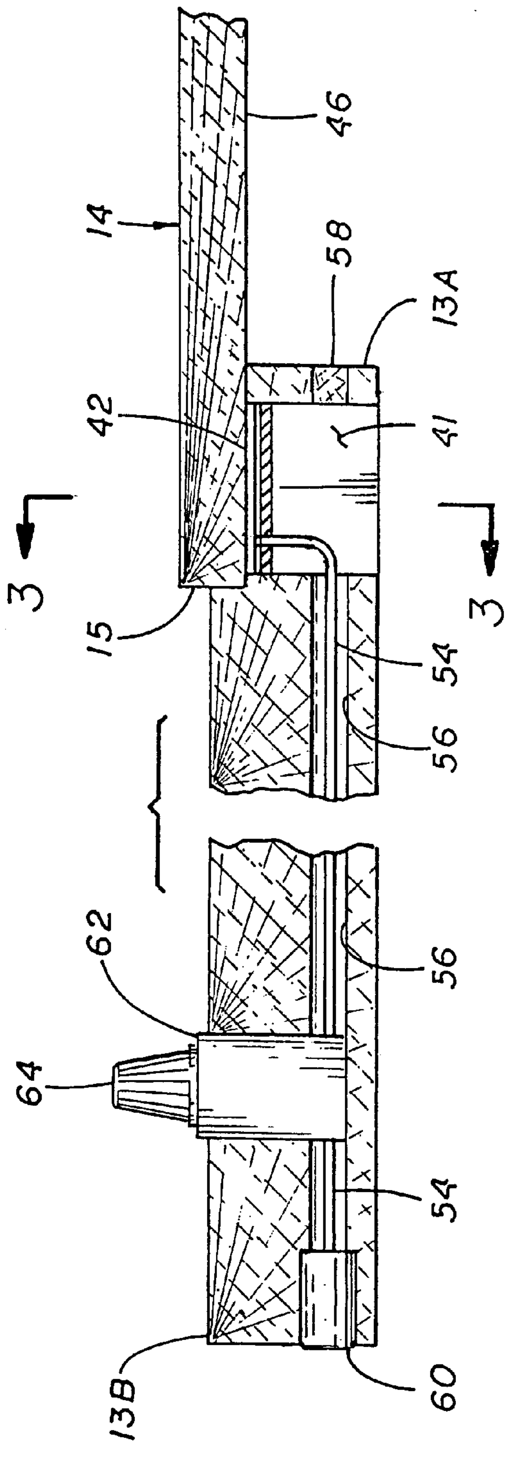
FIG. 2 is a cross-sectional view of the guitar illustrated in FIG. 1 taken along the line 2—2
Figure 3:
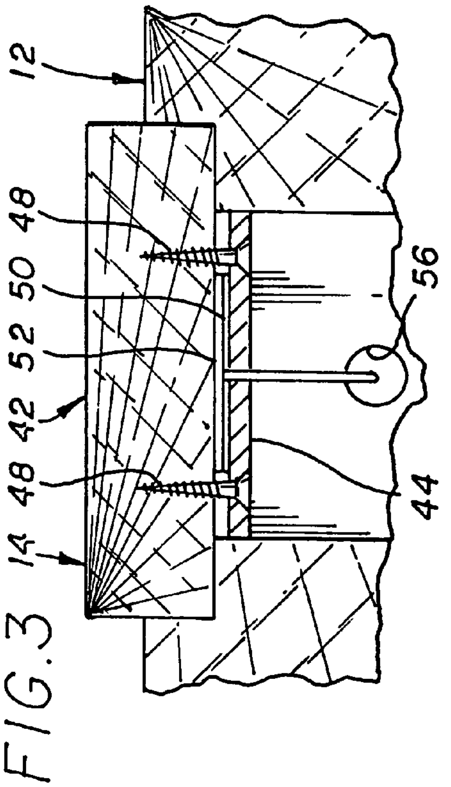
FIG. 3 is a cross-sectional view of FIG. 1 taken along the line 3—3.

Referring to FIGS. 2–3, a compartment 41 is provided in the body 12 at end 13A having a pressure sensor 42, preferably a piezoelectric type pressure sensor, mounted therein The piezoelectric sensor assembly 42 includes a mounting plate 44 held to the surface 46 of the arm 14 by screws 48. An insulation layer 50 is bonded to the mounting plate 44 and the actual piezoelectric wafer 52 is bonded thereto. Thus the wafer 52 is held in firm contact with the surface 46 of the neck 14. Wire leads 54 are connected to the wafer 52 and extend into hole 56 in the body 12. The hole 56 is sealed by a plug 58 at end 13A extends the length of the body terminating at end 13B. An electrical outlet port 60 is mounted in the hole 56 at end 13B. The outlet port 60 is connected to external amplifiers and speaker systems (not shown). The wire leads 54 extend down the hole 56 and couple to three way switch 62. The switch 62 includes an actuator knob 64 accessible from the front surface 11 of the body 12. Wire leads extend from the switch 62 to the outlet port 60.

Figure 4:
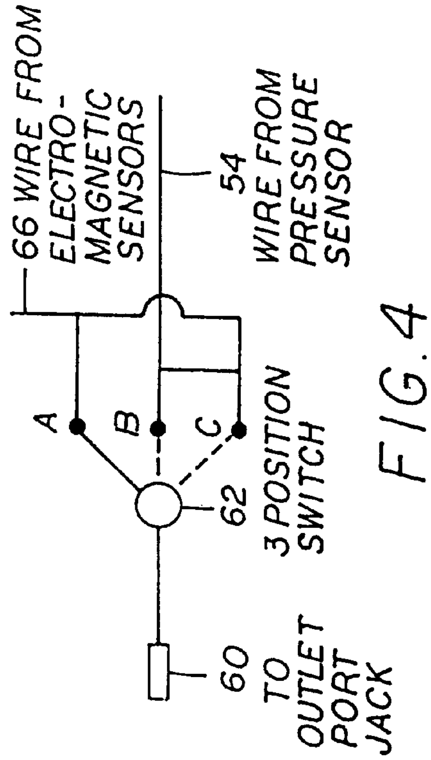
FIG. 4 is a schematic of the wiring system for the guitar.
Figure 5:
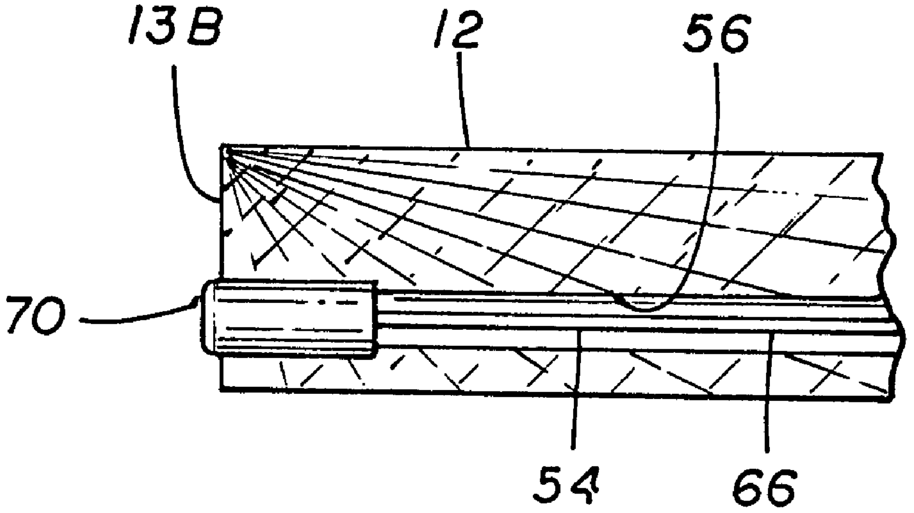
FIG. 5 is a partial view of FIG. 2 illustrating an alternate wiring system for the guitar wherein the electromagnetic pickups and pressure sensor are wired directly to a stereo jack.

Referring to FIG. 4, the wiring is as follows: wire leads 54 are connected to terminal A; wire leads 66 from the groups 22, 23, and 24 connect to terminal B; while both leads 54 and 66 connect to terminal C. Thus by rotating knob 64, electrical signals can be routed as desired. Referring to FIG. 5, alternately, the switch 62 can be eliminated and the wire leads 54 and leads 56 can be coupled directly to a stereo outlet jack 70 replacing the outlet port 60.

Figure 6:
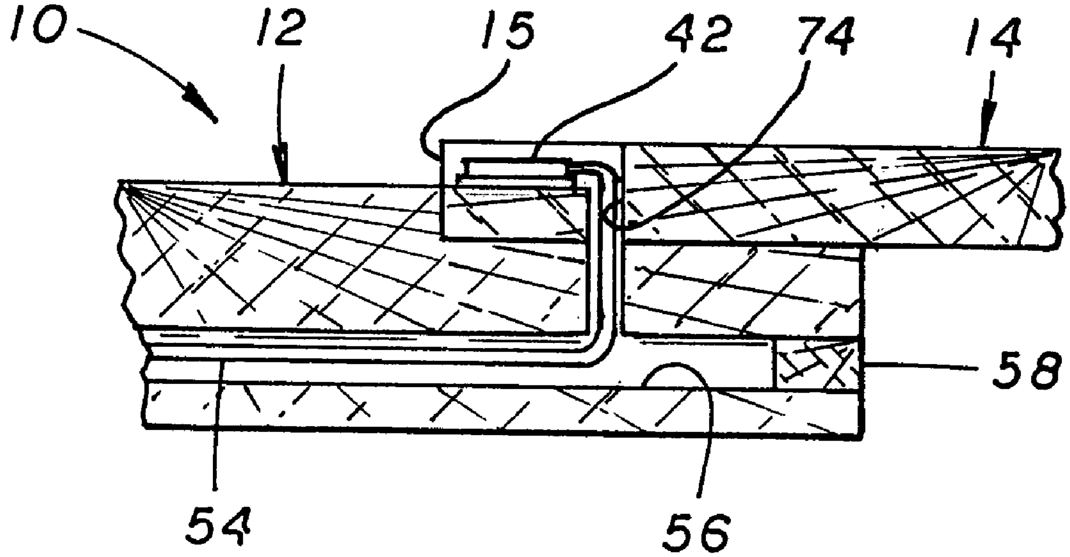
FIG. 6 is a partial cross-sectional view of the guitar shown in FIG. 2 illustrating a second placement of the pressure assembly.

FIG. 6 illustrates and alternate location for the pressure sensor assembly 42. The pressure sensor 42 is mounted at the end 15 of the neck 14. The wire leads 54 extend down through a hole 74 in the neck 14 and body 12, which joins the hole 56.

The pressure sensor picks up the vibrations transmitted through the body 12 and neck 14, which can be picked up by the pressure sensor 42 and amplified to produce the effect of an acoustic guitar. While the pressure sensor 42 could be mounted in other parts of the body, it has been found that best results are obtained when it is mounted between the neck and body. Furthermore, using a piezoelectric type sensor also has been proved to be the best type for this application. Finally, while a single output jack is used, separate output jacks can be used for the pressure sensor and electromagnetic pickups.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to guitar manufacturing industry.

The invention claimed is:

1. An electric guitar having a solid body and neck portions, the guitar comprising:

a pressure sensor located at the junction of the neck and body, said pressure sensor being in direct contact with a surface of the guitar; and an electric circuit connecting said pressure sensor to an electrical outlet jack mounted on an external surface of the guitar's body, said electrical circuit serving for connecting to a sound reproduction system.

2. The electric guitar as set forth in claim 1 comprising:

the guitar having an internal compartment located between the body and neck portions; and said pressure sensor being mounted in said compartment in contact with the neck portion.

3. The electric guitar as set forth in claim 1 wherein said pressure sensor is mounted on the external surface of the guitar at the junction of neck and body portions.

4. The electric guitar as set forth in claim 1, 2 or 3, wherein said pressure sensor is a piezoelectric pressure sensor.

5. The electric guitar as set forth in claim 4 comprising an electrical outlet jack mounted on the surface of the body;

the body having a passageway extending from said pressure sensor to said outlet jack; and a first wire assembly electrically coupling said pressure sensor to said output jack.

6. The electric guitar as set forth in claim 5 wherein the body of the electric guitar includes electromagnetic pickups under the strings, the electric guitar comprising:

a three-way switch mounted in the body coupled to said first wire assembly and between said pressure sensor and said output jack;

a second wire assembly coupling the electromagnetic pickups to said three-way switch;

said three-way switch having a first position coupling only said pressure sensor to said output jack, a second position only coupling said second wire assembly to said output jack, and a third position coupling both said pressure sensor and said second wire assembly to said output jack.

* * * * *